(12) United States Patent
Ikeda

(10) Patent No.: US 11,650,401 B2
(45) Date of Patent: May 16, 2023

(54) ZOOM LENS AND IMAGING APPARATUS

(71) Applicant: FUJIFILM Corporation, Tokyo (JP)

(72) Inventor: Shinkichi Ikeda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 280 days.

(21) Appl. No.: 17/024,941

(22) Filed: Sep. 18, 2020

(65) Prior Publication Data

US 2021/0088765 A1 Mar. 25, 2021

(30) Foreign Application Priority Data

Sep. 24, 2019 (JP) .............................. JP2019-173329

(51) Int. Cl.
  *G02B 15/14* (2006.01)
  *G02B 15/20* (2006.01)
  *G02B 15/167* (2006.01)

(52) U.S. Cl.
  CPC ... *G02B 15/145129* (2019.08); *G02B 15/167* (2013.01); *G02B 15/20* (2013.01)

(58) Field of Classification Search
  CPC .......... G02B 15/145129; G02B 15/167; G02B 15/20; G02B 27/646
  See application file for complete search history.

(56) References Cited

U.S. PATENT DOCUMENTS

| | | | |
|---|---|---|---|
| 5,561,560 A | 10/1996 | Tsutsumi | |
| 2014/0204252 A1* | 7/2014 | Yoshimi | G02B 15/1461 359/683 |
| 2015/0247996 A1 | 9/2015 | Ikeda et al. | |
| 2015/0309292 A1 | 10/2015 | Aoi et al. | |
| 2015/0355436 A1 | 12/2015 | Shimada et al. | |
| 2016/0259155 A1* | 9/2016 | Shimada | G02B 15/145129 |
| 2019/0265448 A1 | 8/2019 | Ogawa et al. | |
| 2020/0004000 A1* | 1/2020 | Ikeda | G02B 13/02 |

FOREIGN PATENT DOCUMENTS

| | | |
|---|---|---|
| JP | H07-248449 A | 9/1995 |
| JP | 2014-142451 A | 8/2014 |
| JP | 2016-012118 A | 1/2016 |
| JP | 2016-151732 A | 8/2016 |
| JP | 2017-215406 A | 12/2017 |
| JP | 2019-008313 A | 1/2019 |
| JP | 2019-148759 A | 9/2019 |
| JP | 2020-085935 A | 6/2020 |
| WO | 2014/073186 A1 | 5/2014 |
| WO | 2014/073187 A1 | 5/2014 |

OTHER PUBLICATIONS

"Notice of Reasons for Refusal" Office Action issued in JP 2019-173329; mailed by the Japanese Patent Office dated Jul. 5, 2022.

* cited by examiner

*Primary Examiner* — Kristina M Deherrera
(74) *Attorney, Agent, or Firm* — Studebaker & Brackett PC

(57) ABSTRACT

A zoom lens consists of, in order from an object side, a positive first lens group, a negative second lens group, a positive third lens group, a positive fourth lens group, and a positive fifth lens group. During zooming, the first lens group and the fifth lens group are not moved, and the second lens group, the third lens group, and the fourth lens group are moved. The second lens group includes a negative lens closest to the object side. In a case where a focal length of the second lens group is denoted by f2 and a focal length of the negative lens of the second lens group closest to the object side is denoted by f21, the zoom lens satisfies $0.6 < f2/f21 < 0.9$.

19 Claims, 9 Drawing Sheets

EXAMPLE 1

EXAMPLE 2

EXAMPLE 3

FIG. 8 EXAMPLE 3

ZOOM LENS AND IMAGING APPARATUS

CROSS-REFERENCE TO RELATED APPLICATIONS

The present application claims priority under 35 U.S.C. § 119 to Japanese Patent Application No. 2019-173329, filed on Sep. 24, 2019. The above application is hereby expressly incorporated by reference, in its entirety, into the present application.

BACKGROUND OF THE INVENTION

1. Field of the Invention

The technology of the present disclosure relates to a zoom lens and an imaging apparatus.

2. Description of the Related Art

In the related art, a zoom lens consisting of a plurality of lens groups of which mutual intervals are changed during zooming has been suggested as a lens system usable in a broadcasting camera, a movie imaging camera, a digital camera, and the like.

For example, JP2017-215406A discloses a zoom lens composed of, in order from an object side to an image side, a first lens group that has a positive refractive power and is not moved for zooming, a second lens group that has a negative refractive power and is moved to the image side during zooming, a lens group that is moved during zooming, an aperture stop, and a lens group that is not moved for zooming.

JP2016-151732A discloses a zoom lens consisting of, in order from an object side to an image side, a first lens group that has a positive refractive power and is not moved for zooming and is moved during focusing, a second lens group that has a negative refractive power and is moved during zooming, a third lens group that has a positive refractive power and is moved during zooming, a fourth lens group that has a positive refractive power and is moved during zooming, and a fifth lens group that has a positive refractive power.

JP2016-012118A discloses a zoom lens substantially consisting of, in order from an object side to an image side, a first lens group having a positive refractive power, a second lens group having a negative refractive power, a third lens group having a positive refractive power, a fourth lens group having a positive refractive power, and a fifth lens group having a positive refractive power, in which during zooming, the first lens group and the fifth lens group are fixed, and the second lens group, the third lens group, and the fourth lens group are moved by changing intervals therebetween.

JP2014-142451A discloses a zoom lens including, in order from an object side to an image side, a first lens group that has a positive refractive power and a focusing function and is not moved for zooming, a second lens group that has a negative refractive power and is monotonically moved to the image side during zooming, a third lens group that has a positive refractive power and is non-linearly moved to the image side during zooming, a fourth lens group that has a positive refractive power and is non-linearly moved to the object side for correcting a change in image surface accompanied by zooming, and a fifth lens group that has a positive refractive power and is not moved for zooming.

SUMMARY OF THE INVENTION

An object of one embodiment according to the technology of the present disclosure is to provide a zoom lens that can achieve a wide angle and a high magnification and has favorable optical characteristics while achieving size reduction, and an imaging apparatus comprising the zoom lens.

A zoom lens according to one aspect of the technology of the present disclosure comprises, in order from an object side to an image side, only five lens groups consisting of a first lens group having a positive refractive power, a second lens group having a negative refractive power, a third lens group having a positive refractive power, a fourth lens group having a positive refractive power, and a fifth lens group having a positive refractive power as lens groups, in which during zooming, the first lens group and the fifth lens group are fixed with respect to an image surface, and the second lens group, the third lens group, and the fourth lens group are moved along an optical axis by changing intervals with an adjacent lens group, the second lens group includes a negative lens closest to the object side, and in a case where a focal length of the second lens group is denoted by $f2$, and a focal length of the negative lens of the second lens group closest to the object side is denoted by $f21$, Conditional Expression (1) below is satisfied.

$$0.6 < f2/f21 < 0.9 \qquad (1)$$

It is preferable that the zoom lens of the aspect further satisfies Conditional Expression (1-1) below.

$$0.68 < f2/f21 < 0.8 \qquad (1\text{-}1)$$

It is preferable that the second lens group includes at least one positive lens, and in a case where a maximum value of a d line-based Abbe number of all positive lenses included in the second lens group is denoted by $\nu 2p$, it is preferable to satisfy Conditional Expression (2) below, and it is more preferable to satisfy Conditional Expression (2-1) below.

$$70 < \nu 2p < 110 \qquad (2)$$

$$80 < \nu 2p < 100 \qquad (2\text{-}1)$$

In a case where a lateral magnification of the second lens group at a telephoto end is denoted by $\beta 2t$, and a lateral magnification of the second lens group at a wide angle end is denoted by $\beta 2w$, it is preferable to satisfy Conditional Expression (3) below, and it is more preferable to satisfy Conditional Expression (3-1) below.

$$10 < \beta 3t/\beta 2w < 25 \qquad (3)$$

$$15 < \beta 2t/\beta 2w < 20 \qquad (3\text{-}1)$$

It is preferable that a surface, on the image side, of the negative lens of the second lens group closest to the object side has an aspherical shape that has a refractive power lower than a refractive power in a paraxial region at an intersection between a principal ray of a maximum angle of view at a wide angle end and the surface.

In a case where a focal length of the third lens group is denoted by $f3$, and a focal length of the fourth lens group is denoted by $f4$, it is preferable to satisfy Conditional Expression (4) below, and it is more preferable to satisfy Conditional Expression (4-1) below.

$$0.4 < f4/f3 < 1 \qquad (4)$$

$$0.45 < f4/f3 < 0.65 \qquad (4\text{-}1)$$

It is preferable that during zooming from a wide angle end to a telephoto end, a third and fourth combined lens group obtained by combining the third lens group and the fourth lens group, and the second lens group pass through a point at which a lateral magnification is a power of −1 at the same time, and the fourth lens group is moved to the object side.

In addition, it is preferable that an interval between the third lens group and the fourth lens group is largest on a wide angle side from a zoom position at which the lateral magnification of the third and fourth combined lens group is a power of −1. Furthermore, in a case where a maximum value of the interval between the third lens group and the fourth lens group on the optical axis is denoted by D34 max, the interval between the third lens group and the fourth lens group on the optical axis at a wide angle end is denoted by D34w, and a combined focal length of the third lens group and the fourth lens group at the wide angle end is denoted by f34w, it is preferable to satisfy Conditional Expression (5) below, and it is more preferable to satisfy Conditional Expression (5-1) below.

$$0.35 < (D34\ max - D34w)/f34w < 0.45 \qquad (5)$$

$$0.38 < (D34\ max - D34w)/f34w < 0.41 \qquad (5\text{-}1)$$

In a case where a combined lateral magnification of the third lens group and the fourth lens group at a telephoto end is denoted by $\beta 34t$, and a combined lateral magnification of the third lens group and the fourth lens group at a wide angle end is denoted by $\beta 34w$, it is preferable to satisfy Conditional Expression (6) below, and it is more preferable to satisfy Conditional Expression (6-1) below.

$$4 < \beta 34t/\beta 34w < 8 \qquad (6)$$

$$5 < \beta 34t/\beta 34w < 7.5 \qquad (6\text{-}1)$$

It is preferable that a stop is arranged between the fourth lens group and the fifth lens group, and the fifth lens group includes, closest to the object side, a vibration proof lens group that is moved in a direction intersecting with the optical axis during image shake correction. In this case, it is preferable that the vibration proof lens group consists of a negative lens, a positive lens, and a negative lens in order from the object side to the image side. In addition, it is preferable that the vibration proof lens group has a negative refractive power, and in a case where a focal length of the zoom lens at a wide angle end is denoted by fw, and a focal length of the vibration proof lens group is denoted by fois, it is preferable to satisfy Conditional Expression (7) below, and it is more preferable to satisfy Conditional Expression (7-1) below.

$$-0.2 < fw/fois < 0 \qquad (7)$$

$$-0.15 < fw/fois < -0.05 \qquad (7\text{-}1)$$

An imaging apparatus according to another aspect of the technology of the present disclosure comprises the zoom lens of the aspect of the present disclosure.

In the present specification, "consist of" or "consisting of" means that a lens that substantially does not have a refractive power, and optical elements such as a stop, a filter, and a cover glass other than a lens, mechanism parts such as a lens flange, a lens barrel, an imaging element, and a camera shake correction mechanism, and the like may be included besides illustrated constituents.

In the present specification, a "~group having a positive refractive power" means that the entire group has a positive refractive power. Similarly, a "~group having a negative refractive power" means that the entire group has a negative refractive power. A "lens having a positive refractive power" and a "positive lens" have the same meaning. A "lens having a negative refractive power" and a "negative lens" have the same meaning. A "~lens group" is not limited to a configuration consisting of a plurality of lenses and may be configured to consist of only one lens.

A compound aspherical lens (a lens in which a spherical lens and a film of an aspherical shape formed on the spherical lens are configured as a single unit and function as one aspherical lens as a whole) is not regarded as a cemented lens and is handled as one lens. The sign of a refractive power and a surface shape related to a lens including an aspherical surface are considered in a paraxial region unless otherwise specified.

The "focal length" used in the conditional expressions is a paraxial focal length. The values used in the conditional expressions are values in a case based on d line in a state where the object at infinity is focused. A partial dispersion ratio $\theta gF$ of a certain lens between g line and F line is defined as $\theta gF=(Ng-NF)/(NF-NC)$ in a case where the refractive indexes of the lens with respect to g line, F line, and C line are denoted by Ng, NF, and NC, respectively. In the present specification, "d line", "C line", "F line", and "g line" are bright lines. The wavelength of d line is 587.56 nanometers (nm). The wavelength of C line is 656.27 nanometers (nm). The wavelength of F line is 486.13 nanometers (nm). The wavelength of g line is 435.84 nanometers (nm).

DESCRIPTION OF THE PREFERRED EMBODIMENTS

Figure 1:
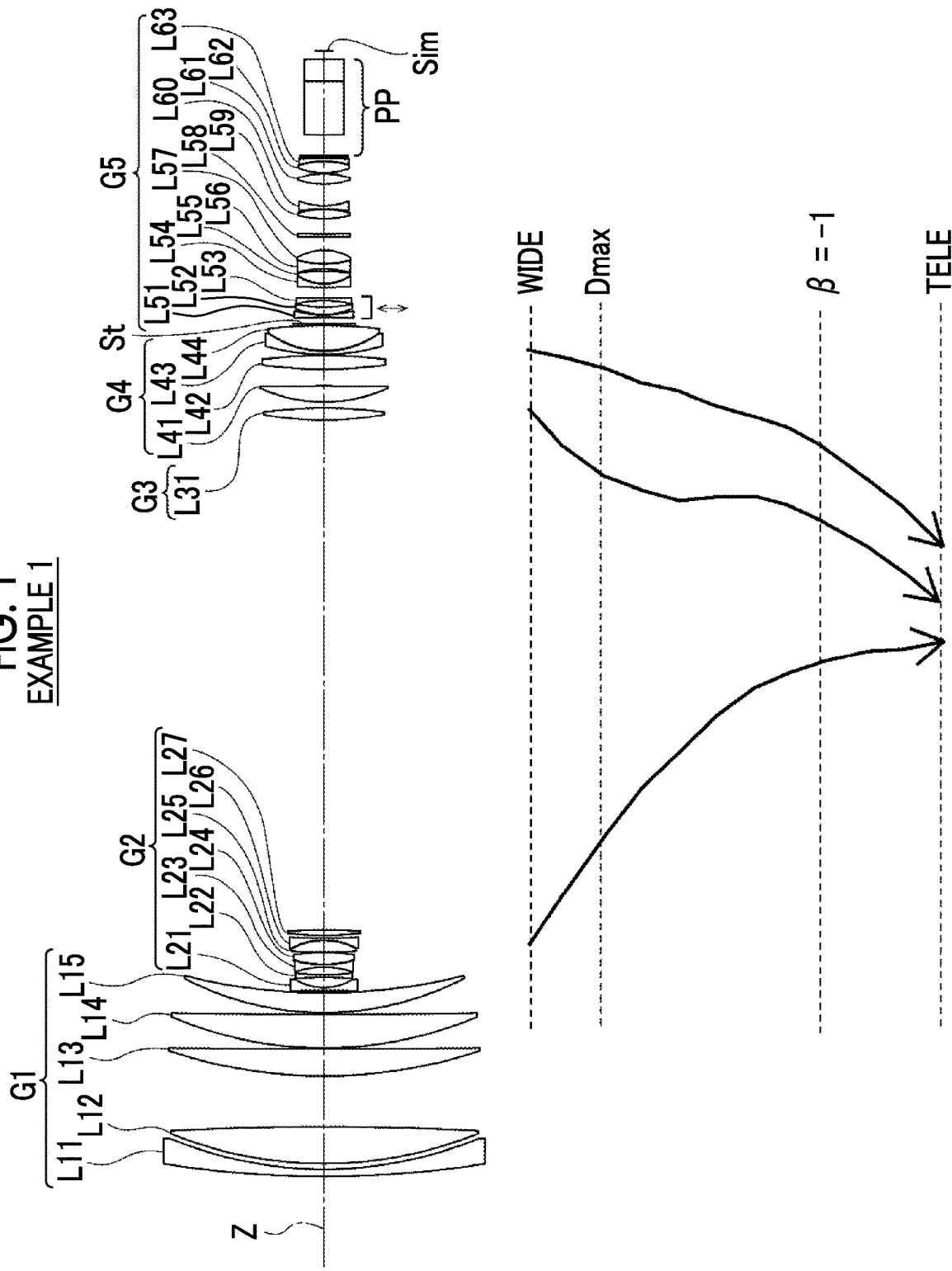
FIG. 1 is a diagram corresponding to a zoom lens of Example 1 of the present disclosure and illustrating a cross-sectional view of a configuration and a movement trajectory of a zoom lens according to one embodiment of the present disclosure.
Figure 2:
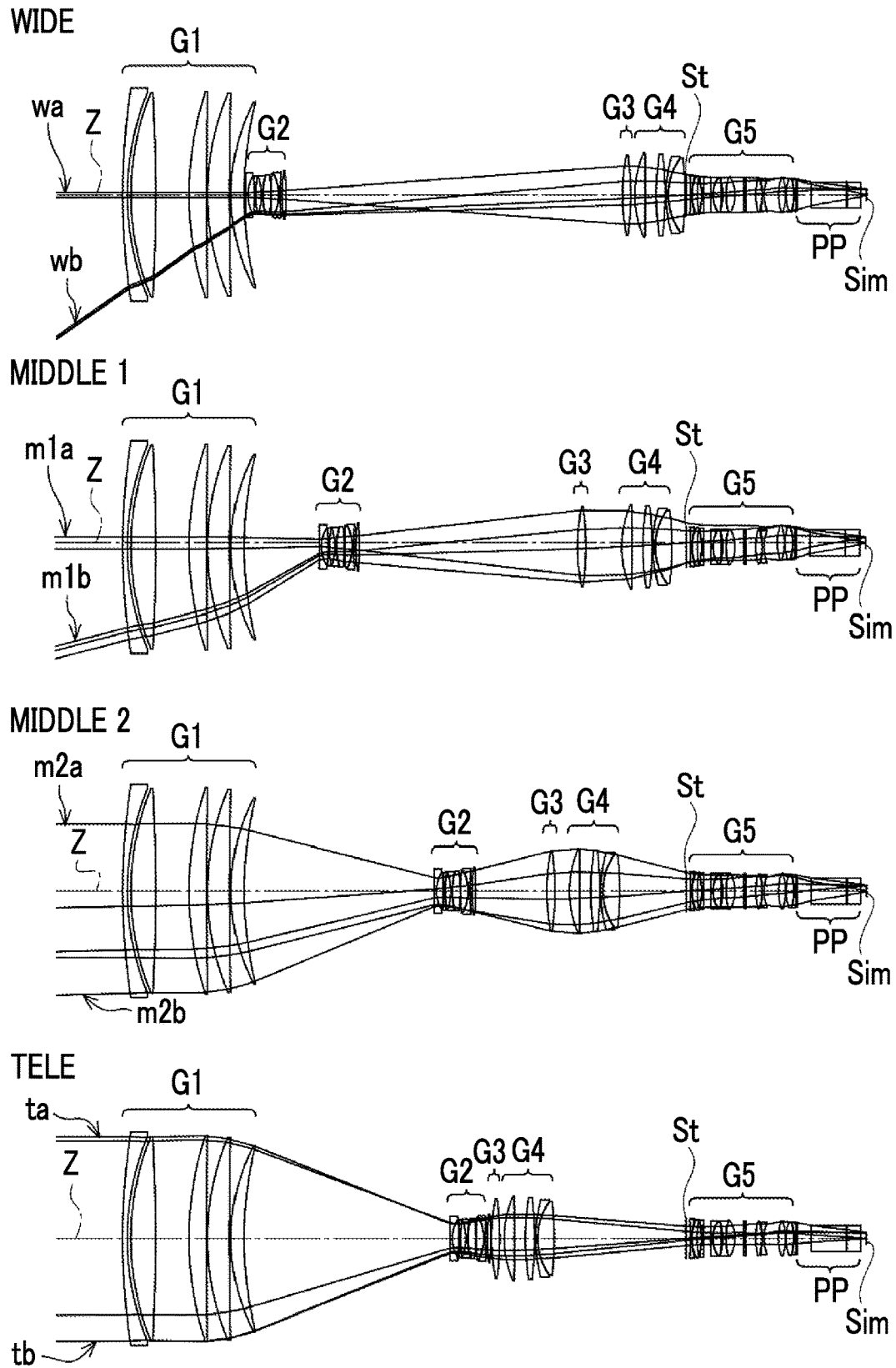
FIG. 2 is a cross-sectional view illustrating a configuration of the zoom lens and luminous flux illustrated in FIG. 1.

Hereinafter, one example of an embodiment according to the technology of the present disclosure will be described with reference to the drawings. FIG. 1 is a diagram illustrating a cross-sectional view of a configuration and a movement trajectory at a wide angle end of a zoom lens according to one embodiment of the present disclosure. FIG. 2 is a cross-sectional view illustrating the configuration of the zoom lens and luminous flux. Examples illustrated in FIG. 1 and FIG. 2 correspond to a zoom lens of Example 1 described later. In the cross-sectional views of FIG. 1 and FIG. 2, a state where an object at infinity is focused is illustrated. A left side is an object side, and a right side is an image side. In FIG. 2, a wide angle end state is illustrated in the uppermost part denoted by "WIDE", a first middle focal length state is illustrated in the second part denoted by "MIDDLE1" from top, a second middle focal length state is illustrated in the third part denoted by "MIDDLE2" from top, and the telephoto end state is illustrated in a lowermost part denoted by "TELE". In FIG. 2, axial luminous flux wa and luminous flux wb of the maximum angle of view in the wide angle end state, axial luminous flux m1a and luminous flux m1b of the maximum angle of view in the first middle focal length state, axial luminous flux m2a and luminous flux m2b of the maximum angle of view in the second middle focal length state, and axial luminous flux to and luminous flux tb of the maximum angle of view in the telephoto end state are illustrated as luminous flux.

In FIG. 1 and FIG. 2, an example in which an optical member PP in which an incidence surface and an emission surface are parallel is arranged between the zoom lens and an image surface Sim is illustrated by assuming application of the zoom lens to an imaging apparatus. The optical member PP is a member that is assumed to correspond to various filters, a cover glass, a prism, and the like. For example, the various filters include a low-pass filter, an infrared cut filter, and a filter cutting a specific wavelength range. The optical member PP is a member not having a refractive power, and the optical member PP can be configured not to be included. Hereinafter, the zoom lens according to one embodiment of the present disclosure will be described mainly with reference to FIG. 1.

The zoom lens comprises only five lens groups consisting of a first lens group G1 having a positive refractive power, a second lens group G2 having a negative refractive power, a third lens group G3 having a positive refractive power, a fourth lens group G4 having a positive refractive power, and a fifth lens group G5 having a positive refractive power as lens groups in order from the object side to the image side along an optical axis Z. During zooming, the first lens group G1 and the fifth lens group G5 are fixed with respect to the image surface Sim, and the second lens group G2, the third lens group G3, and the fourth lens group G4 are moved along the optical axis Z by changing intervals with an adjacent lens group. By having the above configuration that includes five lens groups between which intervals are changed during zooming, and in which a lens group having a positive refractive power is arranged closest to the object side, both a high magnification and reduction of a total length are easily achieved while a change in aberration during zooming is suppressed. Particularly, by providing lens groups having a positive refractive power as the third lens group G3 and the fourth lens group G4, axial chromatic aberration on a telephoto side on which the axial chromatic aberration is likely to be increased can be suppressed. Thus, an advantage of a high magnification is achieved. In addition, by having the configuration in which the first lens group G1 and the fifth lens group G5 are fixed during zooming, the distance from a lens surface closest to the object side to a lens surface closest to the image side is not changed during zooming, and a change in centroid of a lens system can be reduced. Thus, convenience of use during imaging can be increased.

In FIG. 1, the movement trajectory of each lens group during zooming from the wide angle end to the telephoto end is schematically illustrated by a solid arrow below each of the second lens group G2, the third lens group G3, and the fourth lens group G4. In addition, in FIG. 1, the wide angle end and the telephoto end corresponding to the starting point and the ending point of the movement trajectory, respectively, are denoted by "WIDE" and "TELE", respectively.

Each lens group in the example in FIG. 1 is composed of lenses described below. That is, the first lens group G1 consists of five lenses of lenses L11 to L15 in order from the object side to the image side. The second lens group G2 consists of seven lenses of the lenses L21 to L27 in order from the object side to the image side. The third lens group G3 consists of one lens of a lens L31. The fourth lens group G4 consists of four lenses of lenses L41 to L44 in order from the object side to the image side. The fifth lens group G5 consists of 13 lenses of lenses L51 to L63 in order from the object side to the image side. In addition, in the example in FIG. 1, an aperture stop St is arranged between the fourth lens group G4 and the fifth lens group G5. The aperture stop St in FIG. 1 does not illustrate a shape and illustrates a position in an optical axis direction.

The second lens group G2 is configured to comprise a negative lens closest to the object side. By arranging a negative refractive power on the object side inside the second lens group G2, the position of an incidence pupil can be brought closer to the object side in the case of a high magnification. Thus, an increase in diameter of the lens of the first lens group G1 closest to the object side can be suppressed. Accordingly, an advantage of achieving a wide angle while achieving size reduction is achieved.

In a case where the focal length of the second lens group G2 is denoted by f2 and the focal length of the negative lens G2 of the second lens group G2 closest to the object side is denoted by f21, it is configured to satisfy Conditional Expression (1) below. By satisfying Conditional Expression (1) not to be below the lower limit thereof, an effect of bringing the position of the entrance pupil close to the object side is obtained. Thus, an advantage of suppressing an increase in diameter of the lenses of the first lens group G1 is achieved. By satisfying Conditional Expression (1) not to be above the upper limit thereof, an excessive decrease in absolute value of the radius of curvature of the negative lens of the second lens group G2 closest to the object side can be suppressed. Thus, occurrence of distortion at the wide angle end is easily suppressed. Furthermore, in a case where it is configured to satisfy Conditional Expression (1-1) below, more favorable characteristics can be achieved.

$$0.6 < f2/f21 < 0.9 \quad (1)$$

$$0.68 < f2/f21 < 0.8 \quad (1\text{-}1)$$

By having the above group configuration, arranging a negative lens on the side of the second lens group G2 closest to the object side, and setting the refractive power of the negative lens to satisfy Conditional Expression (1), the zoom lens according to the embodiment of the technology of the present disclosure is advantageous for achieving a wide angle and a high magnification and obtaining favorable optical characteristics while achieving size reduction.

Next, a preferred configuration of the zoom lens according to the embodiment of the technology of the present disclosure will be described. It is preferable that the negative lens of the second lens group G2 closest to the object side is an aspherical lens. By arranging the aspherical lens on the side of the second lens group G2 closest to the object side, the distortion at the wide angle end is easily suppressed.

Figure 3:
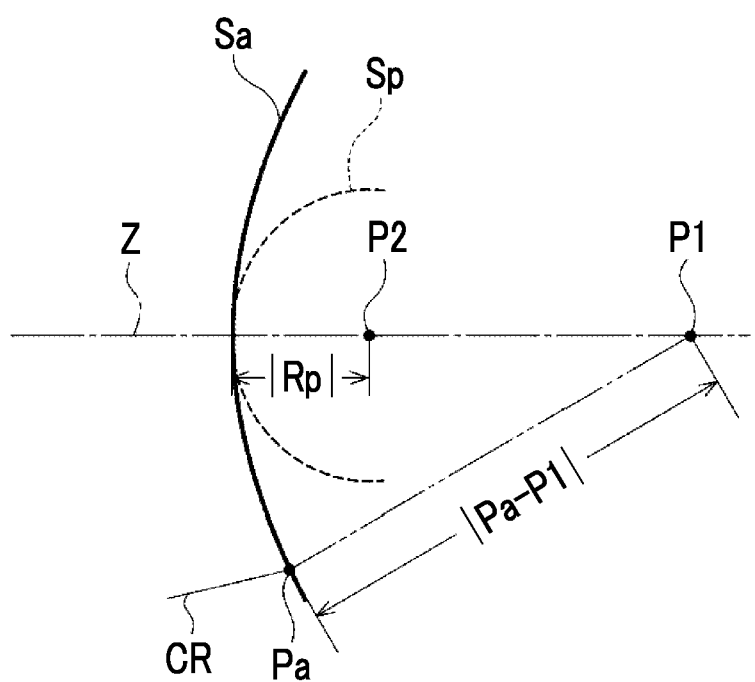
FIG. 3 is a diagram for describing an aspherical shape.

More specifically, it is preferable that the surface, on the image side, of the negative lens of the second lens group G2 closest to the object side is an aspherical surface and the aspherical surface has a shape having a refractive power lower than a refractive power in a paraxial region at an intersection between a principal ray of the maximum angle of view at the wide angle end and the aspherical surface. For example, the magnitude of the refractive power at two different points on the same surface of the aspherical lens consisting of a homogeneous medium can be determined from a magnitude relationship of the absolute value of an approximate radius of curvature at each point. The preferred shape of the aspherical surface will be described below with reference to FIG. 3. For example, a cross-sectional view of an aspherical surface Sa having the above shape is illustrated in FIG. 3. In FIG. 3, a normal line of a surface at an intersection Pa between a principal ray CR of the maximum angle of view at the wide angle end and the aspherical surface Sa is illustrated by a two-dot chain line, and a point at which the normal line intersects with the optical axis Z is illustrated as a point P1. The length |Pa−P1| of a line segment connecting the intersection Pa to the point P1 can be regarded as the absolute value of an approximate radius of curvature at the intersection Pa of the aspherical surface Sa. The absolute value of the radius of curvature in a paraxial region of the aspherical surface Sa is the absolute value of a so-called paraxial radius of curvature. The paraxial radius of curvature of the aspherical surface Sa is the radius of a paraxial spherical surface Sp of the aspherical surface Sa, and the absolute value thereof is illustrated by |Rp| in FIG. 3. The paraxial spherical surface Sp is a spherical surface of the radius |Rp| that passes through an intersection between the aspherical surface Sa and the optical axis Z and has a center at a point P2 on the optical axis. In the example in FIG. 3, the "aspherical surface has a refractive power lower than a refractive power in a paraxial region at an intersection between a principal ray of the maximum angle of view at the wide angle end and the aspherical surface" means that |Pa−P1| is greater than |Rp|.

By forming the surface, on the image side, of the negative lens of the second lens group G2 closest to the object side as the aspherical surface, the distortion at the wide angle end is easily suppressed. In addition, by increasing the absolute value of the radius of curvature in the edge part of the lens compared to the paraxial region, a surface interval between the aspherical surface and an adjacent surface can be further decreased. Thus, the size of the second lens group G2 can be further reduced. Accordingly, since a zoom stroke (movement range during zooming) can be further increased, an advantage of a high magnification is achieved.

In a case where the maximum value of the d line-based Abbe number of all positive lenses included in the second lens group G2 is denoted by ν2p, it is preferable to satisfy Conditional Expression (2) below. By satisfying Conditional Expression (2) not to be below the lower limit thereof, lateral chromatic aberration of a short wavelength caused by the first lens group G1 on a positive side at the wide angle end can be effectively corrected by the second lens group G2. By satisfying Conditional Expression (2) not to be above the upper limit thereof, the refractive index of the positive lenses of the second lens group G2 of which the d line-based Abbe number is ν2p is not excessively decreased. Thus, the absolute value of the radius of curvature of the positive lenses is not excessively decreased. Therefore, an increase in thickness can be suppressed. Accordingly, since an advantage of securing the zoom stroke is achieved, an advantage of a high magnification is achieved. Furthermore, in a case where it is configured to satisfy Conditional Expression (2-1) below, more favorable characteristics can be achieved.

$$70<\nu 2p<110 \tag{2}$$

$$80<\nu 2p<100 \tag{2-1}$$

In a case where the lateral magnification of the second lens group G2 at the telephoto end is denoted by β2t and the lateral magnification of the second lens group G2 at the wide angle end is denoted by β2w, it is preferable to satisfy Conditional Expression (3) below. By satisfying Conditional Expression (3) not to be below the lower limit thereof, a movement amount of the second lens group G2 during zooming can be suppressed. Thus, an advantage of achieving both size reduction and a high magnification is achieved. By satisfying Conditional Expression (3) not to be above the upper limit thereof, the refractive power of the second lens group G2 is not excessively increased. Thus, a change in spherical aberration during zooming is easily suppressed. Furthermore, in a case where it is configured to satisfy Conditional Expression (3-1) below, more favorable characteristics can be achieved.

$$10<\beta 2t/\beta 2w<25 \tag{3}$$

$$15<\beta 2t/\beta 2w<20 \tag{3-1}$$

In a case where the focal length of the third lens group G3 is denoted by f3 and the focal length of the fourth lens group G4 is denoted by f4, it is preferable to satisfy Conditional Expression (4) below. By satisfying Conditional Expression (4) not to be below the lower limit thereof, the refractive power of the third lens group G3 is not excessively decreased with respect to the fourth lens group G4. Thus, the diameter of the lenses of the fourth lens group G4 is easily decreased, and the zoom stroke of the third lens group G3 is easily secured. Thus, an advantage of a high magnification is achieved. By satisfying Conditional Expression (4) not to be above the upper limit thereof, the refractive power of the third lens group G3 is not excessively increased with respect to the fourth lens group G4. Thus, since a change in spherical aberration during zooming is easily suppressed, an advantage of high characteristics is achieved. Furthermore, in a case where it is configured to satisfy Conditional Expression (4-1) below, more favorable characteristics can be achieved.

$$0.4<f4/f3<1 \tag{4}$$

$$0.45<f4/f3<0.65 \tag{4-1}$$

During zooming from the wide angle end to the telephoto end in a state where the object at infinity is focused, it is preferable that a third and fourth combined lens group obtained by combining the third lens group G3 and the fourth lens group G4, and the second lens group G2 pass through a point at which a lateral magnification is a power of −1 at the same time, and the fourth lens group G4 is moved to the object side. In such a case, a high magnification is easily achieved. A zoom position at which the lateral magnification of the third and fourth combined lens group and the lateral magnification of the second lens group G2 are a power of −1 is indicated by "β=−1" in the drawing of the movement trajectory in FIG. 1 and corresponds to the second middle focal length state in FIG. 2.

Furthermore, in the zoom lens, in a state where the object at infinity is focused, it is preferable to configure that the interval between the third lens group G3 and the fourth lens group G4 is largest on the wide angle side from the zoom position at which the lateral magnification of the third and fourth combined lens group is a power of −1. A zoom position at which the interval between the third lens group G3 and the fourth lens group G4 is largest is denoted by "Dmax" in the drawing of the movement trajectory in FIG. 1 and corresponds to the first middle focal length state in FIG. 2. In the lens system such as the zoom lens according to the embodiment of the present disclosure, the amount of outer edge rays of non-axial luminous flux is largest on the wide angle side from the zoom position at which the lateral magnification of the combined lens group is a power of −1. A state where the interval between the third lens group G3 and the fourth lens group G4 is largest is a state where the third lens group G3 is extended to the object side. By having the configuration in which the interval between the third lens group G3 and the fourth lens group G4 is largest within a zoom range between the wide angle end and the zoom position at which the lateral magnification of the third and fourth combined lens group is a power of −1, the third lens group G3 having a positive refractive power can be extended to the object side at or near a zoom position at which the amount of outer edge rays of non-axial luminous flux is largest. Accordingly, since the outer edge rays of the non-axial luminous flux in the first lens group G1 can be further reduced, an increase in diameter of the first lens group G1 can be suppressed, and an advantage of size reduction is achieved.

In a state where the object at infinity is focused, in a case where the third and fourth combined lens group and the second lens group G2 pass through the point at which a lateral magnification is a power of −1 at the same time, and the interval between the third lens group G3 and the fourth lens group G4 is largest on the wide angle side from the zoom position at which the lateral magnification of the third and fourth combined lens group is a power of −1, it is preferable to satisfy Conditional Expression (5) below. The maximum value of the interval on the optical axis between the third lens group G3 and the fourth lens group G4 is denoted by D34 max. The interval on the optical axis between the third lens group G3 and the fourth lens group G4 at the wide angle end is denoted by D34w. A combined focal length of the third lens group G3 and the fourth lens group G4 at the wide angle end is denoted by f34w. By satisfying Conditional Expression (5) not to be below the lower limit thereof, an effect of bringing the position of the entrance pupil close to the object side is sufficiently obtained. Thus, in the case of a high magnification, an increase in diameter of the lenses of the first lens group G1 can be suppressed. By satisfying Conditional Expression (5) not to be above the upper limit thereof, a change in position of the third lens group G3 is not excessively increased. Thus, an advantage of suppressing a change in spherical aberration during zooming on the wide angle side is achieved. Furthermore, in a case where it is configured to satisfy Conditional Expression (5-1) below, more favorable characteristics can be achieved.

$$0.35<(D34\ max-D34w)/f34w<0.45 \quad (5)$$

$$0.38<(D34\ max-D34w)/f34w<0.41 \quad (5-1)$$

In a case where the combined lateral magnification of the third lens group G3 and the fourth lens group G4 at the telephoto end is denoted by β34t and the combined lateral magnification of the third lens group G3 and the fourth lens group G4 at the wide angle end is denoted by β34w, it is preferable to satisfy Conditional Expression (6) below. By satisfying Conditional Expression (6) not to be below the lower limit thereof, the movement amount of each lens group moved during zooming can be suppressed. Thus, both size reduction and a high magnification are easily achieved. By satisfying Conditional Expression (6) not to be above the upper limit thereof, the refractive power of each lens group moved during zooming is not excessively increased. Thus, a change in spherical aberration during zooming is easily suppressed. Furthermore, in a case where it is configured to satisfy Conditional Expression (6-1) below, more favorable characteristics can be achieved.

$$4<β34t/β34w<8 \quad (6)$$

$$5<β34t/β34w<7.5 \quad (6-1)$$

It is preferable that the zoom lens has a vibration proof function. Particularly, a zoom lens of which the zoom magnification exceeds a power of 100 has a long focal length on the telephoto side. Thus, vibration exerted on the zoom lens during imaging cannot be ignored. Accordingly, it is preferable to have the vibration proof function of performing image shake correction. In this case, it is preferable that a vibration proof lens group that is moved in a direction intersecting with the optical axis Z during image shake correction is comprised in the fifth lens group G5 closest to the object side. Furthermore, as illustrated in FIG. 1, it is preferable that the aperture stop St is arranged between the fourth lens group G4 and the fifth lens group G5. By configuring the vibration proof lens group using the lenses of the fifth lens group G5 which is a lens group fixed during zooming and is a lens group having a small lens diameter and a small weight, vibration proofing is easily controlled. In addition, by arranging the vibration proof lens group on the side of the fifth lens group G5 which is closest to the object side and close to the aperture stop St, an advantage of suppressing the spherical aberration is achieved.

In a case where the fifth lens group G5 comprises the vibration proof lens group closest to the object side, it is preferable that the vibration proof lens group has a negative refractive power and Conditional Expression (7) below is satisfied. The focal length of the zoom lens at the wide angle end is denoted by fw, and the focal length of the vibration proof lens group is denoted by fois. By providing a negative refractive power for the vibration proof lens group included in the fifth lens group G5 having a positive refractive power, the refractive power of the vibration proof lens group can be further increased, and the movement amount of the vibration proof lens group in a direction perpendicular to the optical axis Z during image shake correction can be suppressed. By satisfying Conditional Expression (7) not to be below the lower limit thereof, the absolute value of the radius of curvature of lenses of the vibration proof lens group is not excessively decreased. Thus, an advantage of suppressing occurrence of the spherical aberration is achieved. For the upper limit of Conditional Expression (7), the upper limit of Conditional Expression (7) is 0 since the vibration proof lens group has a negative refractive power. Furthermore, it is preferable to satisfy Conditional Expression (7-1) below. By satisfying Conditional Expression (7-1) not to be below the lower limit thereof, an advantage of suppressing occurrence of the spherical aberration is achieved. By providing a negative refractive power for the vibration proof lens group and satisfying Conditional Expression (7-1) not to be above the upper limit thereof, the movement amount of the vibration proof lens group in a direction perpendicular to the optical axis Z during image shake correction can be suppressed. Thus, an increase in diameter of the vibration proof lens group can be suppressed. Accordingly, control is easily performed.

$$-0.2<fw/fois<0 \quad (7)$$

$$-0.15<fw/fois<-0.05 \quad (7-1)$$

It is preferable that the vibration proof lens group consists of a negative lens, a positive lens, and a negative lens in order from the object side to the image side. In such a case, an advantage of suppressing the spherical aberration during image shake correction is achieved. In the example in FIG. 1, the vibration proof lens group consists of three lenses of the lenses L51 to L53. Upward and downward bidirectional arrows shown below the lenses L51 to L53 in FIG. 1 indicate that the lenses L51 to L53 are the vibration proof lens group.

The example illustrated in FIG. 1 is one example and can be subjected to various modifications within the scope of the technology of the present disclosure. For example, the number of lenses constituting each lens group can be a number different from the example illustrated in FIG. 1.

The above preferred configurations and available configurations can be randomly combined and preferably, are appropriately selectively employed depending on required specifications. According to the technology of the present disclosure, a zoom lens that can achieve a wide angle and a high magnification and has favorable optical characteristics while achieving size reduction can be implemented. The "wide angle" here means that the total angle of view at the wide angle end is greater than or equal to 70 degrees, and the "high magnification" means that the zoom magnification is greater than or equal to a power of 100.

Next, examples of the numerical value of the zoom lens according to the embodiment of the present disclosure will be described.

Example 1

A configuration and a movement trajectory of the zoom lens of Example 1 are illustrated in FIG. 1, and the illustration method and the configuration thereof are described above. Thus, a duplicate description will be partially omitted here. The zoom lens of Example 1 consists of, in order from the object side to the image side, the first lens group G1 having a positive refractive power, the second lens group G2 having a negative refractive power, the third lens group G3 having a positive refractive power, the fourth lens group G4 having a positive refractive power, the aperture stop St, and the fifth lens group G5 having a positive refractive power. During zooming, the first lens group G1, the aperture stop St, and the fifth lens group G5 are fixed with respect to the image surface Sim, and the second lens group G2, the third lens group G3, and the fourth lens group G4 are moved along the optical axis Z by changing intervals with an adjacent lens group. The first lens group G1 consists of five lenses. The second lens group G2 consists of seven lenses. The third lens group G3 consists of one lens. The fourth lens group G4 consists of four lenses. The fifth lens group G5 consists of 13 lenses. The vibration proof lens group consists of three lenses of the first, second, and third lenses of the fifth lens group G5 from the object side. Above is the summary of the zoom lens of Example 1.

For the zoom lens of Example 1, fundamental lens data is shown in Table 1A and Table 1B, specifications and variable surface intervals are shown in Table 2, and aspherical coefficients are shown in Table 3. The fundamental lens data is separately displayed in two tables of Table 1A and Table 1B in order to avoid one long table. Table 1A shows the first lens group G1 to the fourth lens group G4, and Table 1B shows the aperture stop St, the fifth lens group G5, and the optical member PP. Table 1A, Table 1B, and Table 2 show data in a state where the object at infinity is focused.

In Table 1A and Table 1B, the field of Sn shows a surface number in a case where the surface closest to the object side is set as a first surface and the number is increased by one at a time toward the image side. The field of R shows the radius of curvature of each surface. The field of D shows a surface interval on the optical axis between each surface and a surface adjacent thereto on the image side. The field of Nd shows the refractive index of each constituent with respect to d line. The field of vd shows the d line-based Abbe number of each constituent. The field of θgF shows the partial dispersion ratio of each constituent between g line and F line.

In Table 1A and Table 1B, the sign of the radius of curvature of a surface having a shape of a convex surface toward the object side is positive, and the sign of the radius of curvature of a surface having a shape of a convex surface toward the image side is negative. In Table 1B, the surface number and a word (St) are written in the field of the surface number of the surface corresponding to the aperture stop St. In Table 1A and Table 1B, a symbol DD[ ] is used for the variable surface interval during zooming. The variable surface interval is shown in the field of D by adding the surface number on the object side of the interval in [ ].

Table 2 shows a zoom magnification Zr, a focal length f, a back focus Bf converted to a distance in air, an F number FNo., a maximum total angle of view 2ω, and the variable surface interval during zooming based on d line. In the field of 2ω, (°) means that the unit is degree. In Table 2, values in the wide angle end state, the first middle focal length state, the second middle focal length state, and the telephoto end state are shown in the fields marked with WIDE, MIDDLE1, MIDDLE2, and TELE, respectively.

In the fundamental lens data, the surface number of an aspherical surface is marked with *, and the numerical value of a paraxial radius of curvature is written in the field of the radius of curvature of the aspherical surface. In Table 3, the field of Sn shows the surface number of the aspherical surface, and the fields of KA and Am (m=3, 4, 5, . . . 16) show the numerical value of the aspherical coefficient for each aspherical surface. In the numerical value of the aspherical coefficient in Table 3, "E±n" (n: integer) means "×10±n". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where

Zd: aspherical depth (length of a perpendicular line drawn from a point on the aspherical surface having a height h to a plane that is in contact with an aspherical vertex and is perpendicular to the optical axis)

h: height (distance from the optical axis to the lens surface)

C: reciprocal of paraxial radius of curvature

KA and Am: aspherical coefficients

In the aspherical expression, Σ means the total sum related to m.

In the data of each table, degree is used as the unit of angle, and mm (millimeter) is used as the unit of length. However, since the optical system can be used even in a case where propositional enlargement or propositional reduction is performed, other appropriate units can also be used. In addition, numerical values that are rounded to a predetermined number of digits are written in each table shown below.

TABLE 1A

Example 1

| Sn | R | D | Nd | vd | θ gF |
|---|---|---|---|---|---|
| 1 | 664.41942 | 4.400 | 1.83400 | 37.18 | 0.5778 |
| 2 | 259.43272 | 3.372 | | | |
| 3 | 261.91743 | 22.945 | 1.43387 | 95.18 | 0.5373 |
| 4 | −1842.02048 | 31.132 | | | |
| 5 | 319.39289 | 16.601 | 1.43387 | 95.18 | 0.5373 |
| 6 | 9718.64874 | 0.601 | | | |
| 7 | 252.66391 | 20.611 | 1.43387 | 95.18 | 0.5373 |
| 8 | 5759.75322 | 0.964 | | | |
| 9 | 194.83284 | 12.114 | 1.43875 | 94.94 | 0.5343 |
| 10 | 369.56307 | DD[10] | | | |
| 11 | −726.24678 | 2.000 | 2.00069 | 25.46 | 0.6136 |
| *12 | 35.82739 | 6.067 | | | |
| 13 | −302.57116 | 1.500 | 1.99576 | 25.91 | 0.6127 |
| 14 | 134.91522 | 4.932 | | | |
| 15 | −53.57502 | 1.520 | 1.92378 | 28.68 | 0.6027 |
| 16 | 71.22187 | 7.383 | 1.93128 | 26.94 | 0.6081 |
| 17 | −133.84745 | 0.263 | | | |
| 18 | 320.63390 | 7.031 | 1.97411 | 17.80 | 0.6588 |
| 19 | −45.60472 | 1.520 | 1.82467 | 45.53 | 0.5594 |
| 20 | 398.66379 | 1.752 | | | |
| 21 | 202.05826 | 3.284 | 1.43875 | 94.94 | 0.5343 |
| 22 | −338.04368 | DD[22] | | | |
| 23 | 199.24853 | 7.645 | 1.49700 | 81.54 | 0.5375 |
| *24 | −274.55415 | DD[24] | | | |
| 25 | 100.70689 | 9.669 | 1.43700 | 95.10 | 0.5336 |
| 26 | −3837.89568 | 10.158 | | | |
| *27 | 213.05884 | 8.584 | 1.43700 | 95.10 | 0.5336 |
| 28 | −322.23495 | 0.813 | | | |
| 29 | 136.70434 | 2.000 | 1.80000 | 29.84 | 0.6018 |
| 30 | 60.90998 | 15.602 | 1.43700 | 95.10 | 0.5336 |
| 31 | −300.15592 | DD[31] | | | |

TABLE 1B

Example 1

| Sn | R | D | Nd | Vd | θ gF |
|---|---|---|---|---|---|
| 32 (St) | ∞ | 4.145 | | | |
| 33 | −273.15066 | 1.500 | 1.77250 | 49.62 | 0.5519 |
| 34 | 71.46199 | 0.120 | | | |
| 35 | 45.32395 | 4.634 | 1.80518 | 25.46 | 0.6157 |
| 36 | 85.48390 | 3.984 | | | |
| 37 | −75.79001 | 1.500 | 1.48749 | 70.32 | 0.5292 |
| 38 | 2007.26681 | 6.704 | | | |
| 39 | 703.09361 | 2.000 | 1.84653 | 37.15 | 0.5793 |
| 40 | 30.22144 | 8.013 | 1.80518 | 25.43 | 0.6103 |
| 41 | −94.76183 | 1.291 | | | |
| 42 | −55.03851 | 3.000 | 1.90265 | 35.77 | 0.5816 |
| 43 | 65.60600 | 8.342 | 1.43097 | 74.34 | 0.5237 |
| 44 | −33.43149 | 8.300 | | | |
| 45 | −2405.54510 | 1.738 | 1.57933 | 67.72 | 0.5414 |
| 46 | 1025.85467 | 9.260 | | | |
| 47 | 67.37815 | 5.753 | 1.59840 | 44.89 | 0.5687 |
| 48 | −56.80682 | 0.193 | | | |
| 49 | −99.15029 | 2.000 | 1.90265 | 35.77 | 0.5816 |
| 50 | 44.13809 | 13.254 | | | |
| 51 | 51.63956 | 6.566 | 1.45873 | 62.88 | 0.5340 |
| 52 | −56.14324 | 0.586 | | | |
| 53 | 46.72642 | 7.237 | 1.48749 | 70.32 | 0.5292 |
| 54 | −51.72163 | 2.000 | 1.90265 | 35.77 | 0.5816 |
| 55 | −200.51494 | 0.250 | | | |
| 56 | ∞ | 1.000 | 1.51633 | 64.14 | 0.5353 |
| 57 | ∞ | 12.778 | | | |
| 58 | ∞ | 33.000 | 1.60859 | 46.44 | 0.5666 |
| 59 | ∞ | 13.200 | 1.51633 | 64.05 | 0.5346 |
| 60 | ∞ | 5.505 | | | |

TABLE 2

Example 1

| | WIDE | MIDDLE1 | MIDDLE2 | TELE |
|---|---|---|---|---|
| Zr | 1.00 | 2.40 | 29.64 | 120.00 |
| f | 8.254 | 19.809 | 244.625 | 990.444 |
| Bf | 48.413 | 48.413 | 48.413 | 48.413 |
| FNo. | 1.76 | 1.76 | 1.94 | 5.13 |
| 2ω (°) | 70.72 | 29.66 | 2.54 | 0.64 |
| DD[10] | 1.399 | 70.006 | 177.097 | 191.340 |
| DD[22] | 312.507 | 202.094 | 66.303 | 0.755 |
| DD[24] | 3.811 | 33.411 | 13.413 | 3.979 |
| DD[31] | 0.903 | 13.110 | 61.808 | 122.546 |

TABLE 3

Example 1

| Sn | 12 | 24 | 27 |
|---|---|---|---|
| KA | 1.0000000E+00 | 1.0000000E+00 | 1.0000000E+00 |
| A4 | −2.0191978E−07 | 1.7791290E−07 | −1.6269121E−07 |
| A6 | −8.1751007E−09 | −4.8036117E−10 | −7.4853607E−10 |
| A8 | 1.6892189E−10 | 1.0093624E−12 | 1.7684966E−12 |
| A10 | −2.2627205E−12 | −1.1288455E−15 | −2.4502625E−15 |
| A12 | 1.7733220E−14 | 5.7027065E−19 | 2.0124511E−18 |
| A14 | −8.2804655E−17 | 8.7658688E−23 | −9.0462985E−22 |
| A16 | 2.2540276E−19 | −2.6814685E−25 | 1.4936804E−25 |
| A18 | −3.2813787E−22 | 1.2885065E−28 | 3.0840606E−29 |
| A20 | 1.9634359E−25 | −2.1227242E−32 | −1.1398474E−32 |

Figure 4:
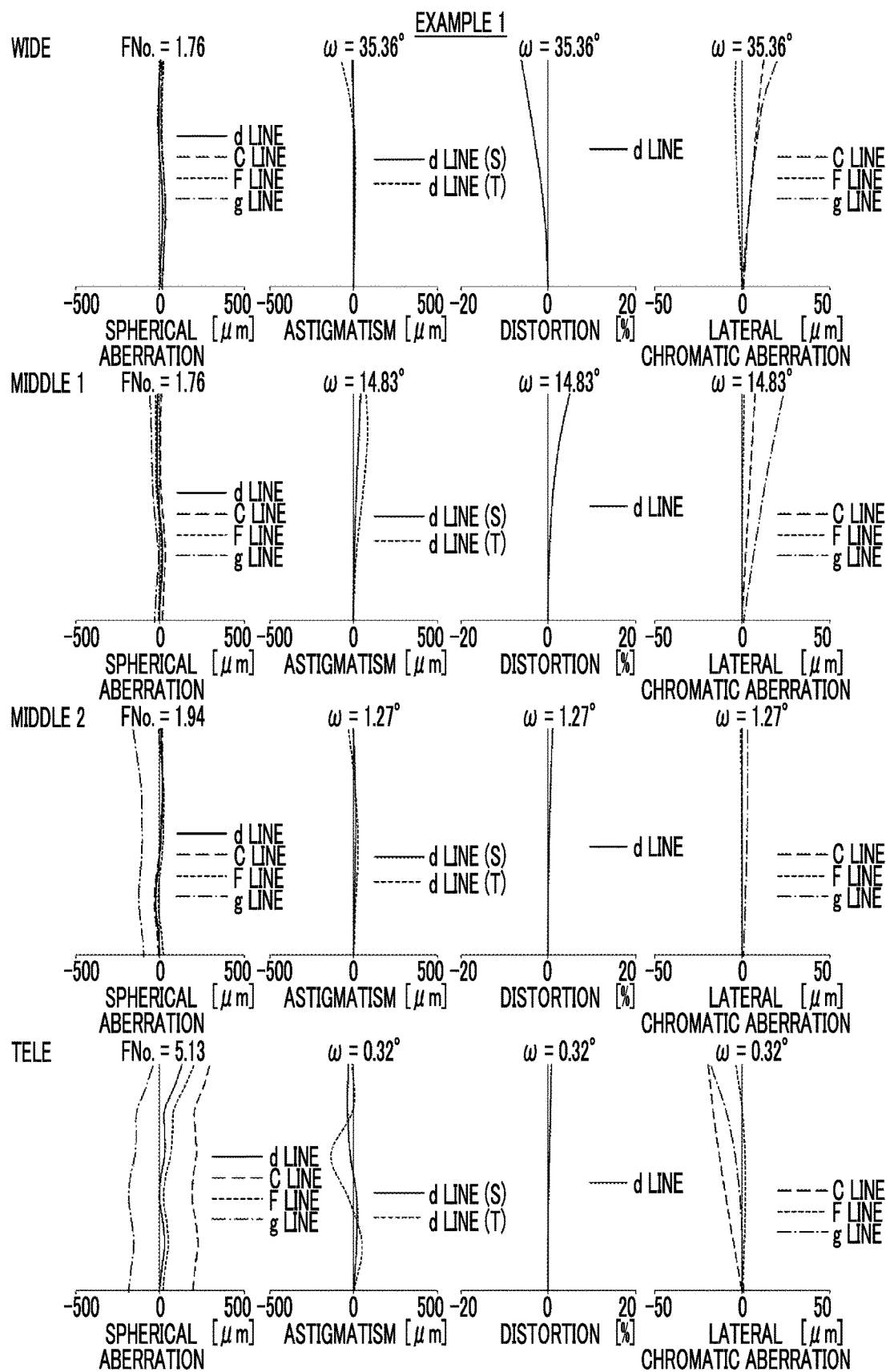
FIG. 4 is each aberration diagram of the zoom lens of Example 1 of the present disclosure.

FIG. 4 illustrates each aberration diagram of the zoom lens of Example 1 in a state where the object at infinity is focused. In FIG. 4, in order from the left, spherical aberration, astigmatism, distortion, and lateral chromatic aberration are illustrated. In FIG. 4, aberration in the wide angle end state is illustrated in the uppermost part denoted by "WIDE", aberration in the first middle focal length state is illustrated in the second part denoted by "MIDDLE1" from top, aberration in the second middle focal length state is illustrated in the third part denoted by "MIDDLE2" from top, and aberration in the telephoto end state is illustrated in the lowermost part denoted by "TELE". In the spherical aberration diagram, a solid line, a long broken line, a short broken line, and a one-dot chain line illustrate aberration on d line, C line, F line, and g line, respectively. In the astigmatism diagram, a solid line illustrates aberration on d line in a sagittal direction, and a short broken line illustrates aberration on d line in a tangential direction. In the distortion diagram, a solid line illustrates aberration on d line. In the lateral chromatic aberration diagram, a long broken line, a short broken line, and a one-dot chain line illustrate aberration on C line, F line, and g line, respectively. In the spherical aberration diagram, FNo. means the F number. In other aberration diagrams, ω means a half angle of view.

Symbols, meanings, writing methods, and illustration methods of each data related to Example 1 are the same in the following examples unless otherwise specified. Thus, duplicate descriptions will be omitted below.

Example 2

Figure 5:
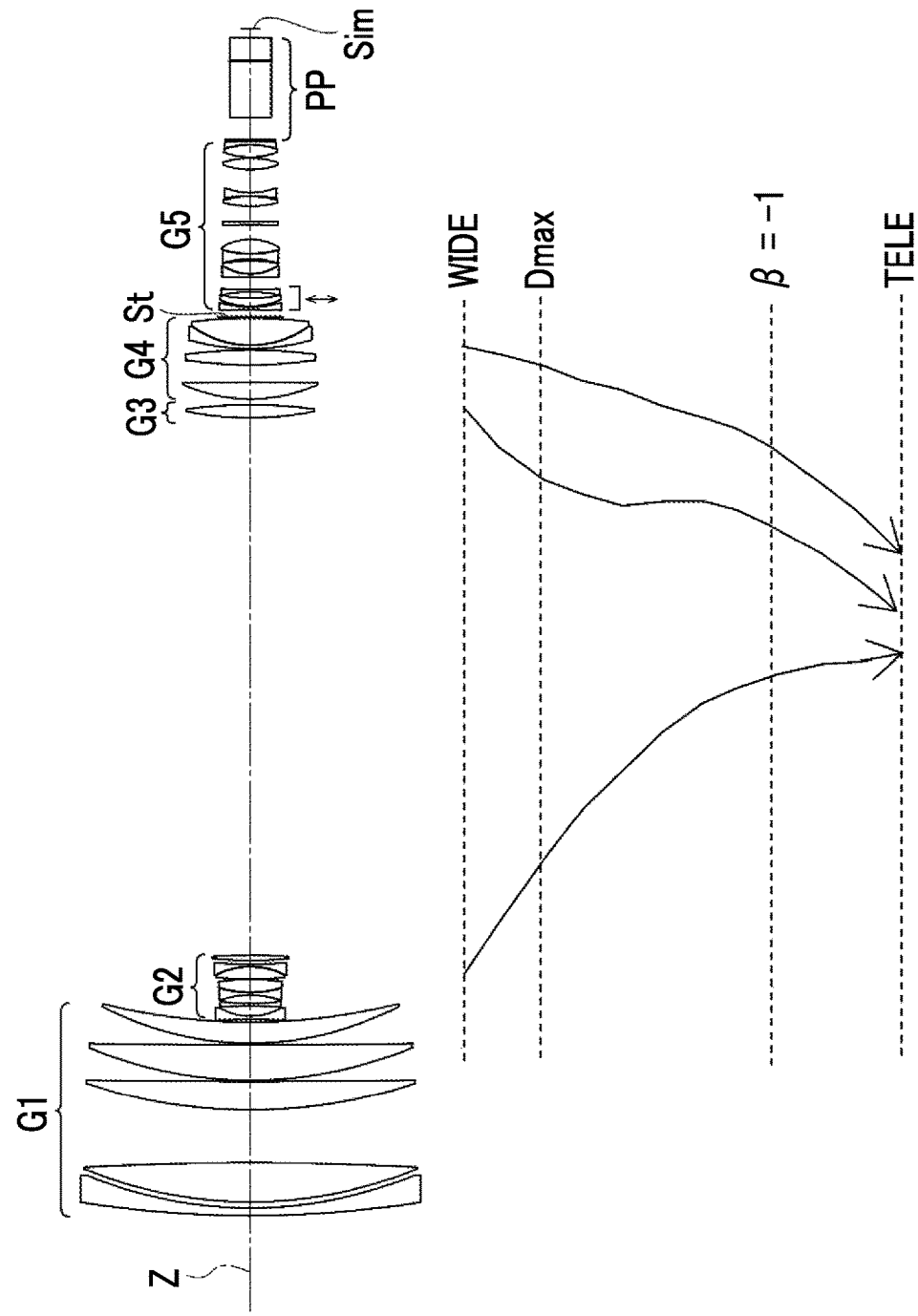
FIG. 5 is a diagram illustrating a cross-sectional view of a configuration and a movement trajectory of a zoom lens of Example 2 of the present disclosure.
Figure 6:
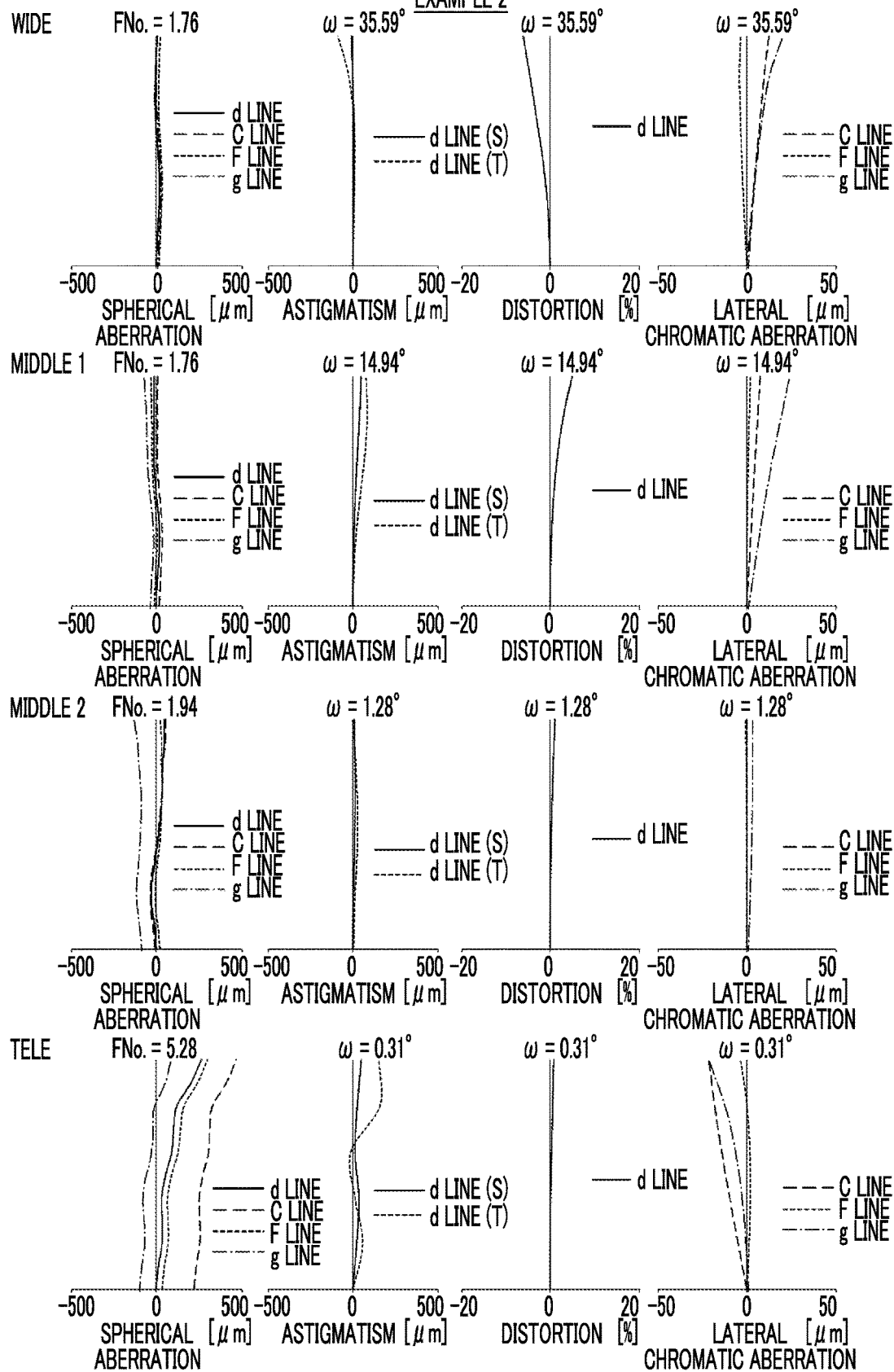
FIG. 6 is each aberration diagram of the zoom lens of Example 2 of the present disclosure.

A configuration and a movement trajectory of a zoom lens of Example 2 are illustrated in FIG. 5. The zoom lens of Example 2 has the same configuration as the summary of the zoom lens of Example 1. For the zoom lens of Example 2, fundamental lens data is shown in Table 4A and Table 4B, specifications and variable surface intervals are shown in Table 5, aspherical coefficients are shown in Table 6, and each aberration diagram is illustrated in FIG. 6.

TABLE 4A

Example 2

| Sn | R | D | Nd | vd | θgF |
|---|---|---|---|---|---|
| 1 | 667.89575 | 4.400 | 1.83400 | 37.18 | 0.5778 |
| 2 | 259.64277 | 3.393 | | | |
| 3 | 262.44076 | 23.050 | 1.43387 | 95.18 | 0.5373 |
| 4 | −1785.43357 | 30.819 | | | |
| 5 | 317.40954 | 16.635 | 1.43387 | 95.18 | 0.5373 |
| 6 | 7289.89387 | 0.624 | | | |
| 7 | 250.93483 | 20.748 | 1.43387 | 95.18 | 0.5373 |
| 8 | 5907.82835 | 0.913 | | | |
| 9 | 193.75308 | 12.175 | 1.43875 | 94.94 | 0.5343 |
| 10 | 365.55881 | DD[10] | | | |
| 11 | −867.69585 | 2.000 | 2.00069 | 25.46 | 0.6136 |
| *12 | 35.79474 | 5.983 | | | |
| 13 | −290.78651 | 1.500 | 1.99979 | 26.19 | 0.6110 |
| 14 | 130.01976 | 4.974 | | | |
| 15 | −53.32404 | 1.520 | 1.92451 | 28.57 | 0.6031 |
| 16 | 67.22394 | 7.484 | 1.93234 | 27.18 | 0.6073 |
| 17 | −135.98833 | 0.337 | | | |
| 18 | 317.18152 | 7.001 | 1.97468 | 17.84 | 0.6586 |
| 19 | −45.51233 | 1.520 | 1.82661 | 45.34 | 0.5597 |
| 20 | 403.10593 | 2.091 | | | |
| 21 | 245.04219 | 3.005 | 1.49700 | 81.64 | 0.5371 |
| 22 | −341.23879 | DD[22] | | | |
| 23 | 198.63378 | 7.485 | 1.49700 | 81.54 | 0.5375 |
| *24 | −275.84703 | DD[24] | | | |
| 25 | 101.20881 | 9.631 | 1.43700 | 95.10 | 0.5336 |
| 26 | −3532.78050 | 10.163 | | | |
| *27 | 212.59263 | 8.646 | 1.43700 | 95.10 | 0.5336 |
| 28 | −319.52820 | 0.813 | | | |
| 29 | 136.58359 | 2.000 | 1.80000 | 29.84 | 0.6018 |
| 30 | 60.96879 | 15.653 | 1.43700 | 95.10 | 0.5336 |
| 31 | −300.12413 | DD[31] | | | |

TABLE 4B

Example 2

| Sn | R | D | Nd | Vd | θgF |
|---|---|---|---|---|---|
| 32 (St) | ∞ | 4.207 | | | |
| 33 | −269.83471 | 1.500 | 1.77250 | 49.62 | 0.5519 |
| 34 | 71.53897 | 0.319 | | | |
| 35 | 45.32929 | 4.635 | 1.80518 | 25.46 | 0.6157 |
| 36 | 85.51411 | 3.966 | | | |
| 37 | −75.71812 | 1.500 | 1.48749 | 70.32 | 0.5292 |
| 38 | 2079.87184 | 6.727 | | | |
| 39 | 704.39860 | 2.000 | 1.84638 | 37.83 | 0.5774 |
| 40 | 30.19570 | 7.962 | 1.80518 | 25.43 | 0.6103 |
| 41 | −94.79347 | 1.233 | | | |
| 42 | −55.05033 | 3.000 | 1.90265 | 35.77 | 0.5816 |
| 43 | 65.66626 | 8.352 | 1.43096 | 75.65 | 0.5241 |
| 44 | −33.43388 | 8.265 | | | |
| 45 | −2376.80173 | 1.723 | 1.58187 | 67.40 | 0.5416 |
| 46 | 1026.45177 | 9.223 | | | |
| 47 | 67.37193 | 5.726 | 1.59838 | 45.30 | 0.5678 |
| 48 | −56.78430 | 0.194 | | | |
| 49 | −99.16001 | 2.000 | 1.90265 | 35.77 | 0.5816 |
| 50 | 44.12218 | 13.350 | | | |
| 51 | 51.65822 | 6.568 | 1.45860 | 63.95 | 0.5308 |
| 52 | −56.14886 | 0.576 | | | |
| 53 | 46.59176 | 7.230 | 1.48749 | 70.32 | 0.5292 |
| 54 | −51.69543 | 2.000 | 1.90265 | 35.77 | 0.5816 |
| 55 | −200.41739 | 0.250 | | | |
| 56 | ∞ | 1.000 | 1.51633 | 64.14 | 0.5353 |
| 57 | ∞ | 12.631 | | | |
| 58 | ∞ | 33.000 | 1.60859 | 46.44 | 0.5666 |
| 59 | ∞ | 13.200 | 1.51633 | 64.05 | 0.5346 |
| 60 | ∞ | 5.505 | | | |

TABLE 5

Example 2

| | WIDE | MIDDLE1 | MIDDLE2 | TELE |
|---|---|---|---|---|
| Zr | 1.00 | 2.40 | 29.86 | 125.00 |
| f | 8.185 | 19.643 | 244.397 | 1023.098 |
| Bf | 48.266 | 48.266 | 48.266 | 48.266 |
| FNo. | 1.76 | 1.76 | 1.94 | 5.28 |
| 2ω (°) | 71.18 | 29.88 | 2.56 | 0.62 |
| DD[10] | 1.437 | 69.826 | 176.854 | 191.096 |
| DD[22] | 312.555 | 202.190 | 66.508 | 0.331 |
| DD[24] | 3.332 | 33.139 | 13.139 | 1.790 |
| DD[31] | 0.977 | 13.147 | 61.801 | 125.084 |

TABLE 6

Example 2

| Sn | 12 | 24 | 27 |
|---|---|---|---|
| KA | 1.0000000E+00 | 1.0000000E+00 | 1.0000000E+00 |
| A4 | −1.4489863E−07 | 1.8030051E−07 | −1.5679108E−07 |
| A6 | −7.4320690E−09 | −4.8028415E−10 | −7.7149896E−10 |
| A8 | 1.5909463E−10 | 9.7553651E−13 | 1.8418732E−12 |
| A10 | −2.2222325E12 | −1.0181408E−15 | −2.6380874E−15 |
| A12 | 1.8051203E−14 | 3.9625748E−19 | 2.3387081E−18 |
| A14 | −8.6855017E−17 | 2.4303986E−22 | −1.2535928E−21 |
| A16 | 2.4247209E−19 | −3.4755166E−25 | 3.6869883E−25 |
| A18 | −3.6071208E−22 | 1.5017597E−28 | −4.3551872E−29 |
| A20 | 2.2002077E−25 | −2.3509652E−32 | −8.7911957E−34 |

Example 3

Figure 7:
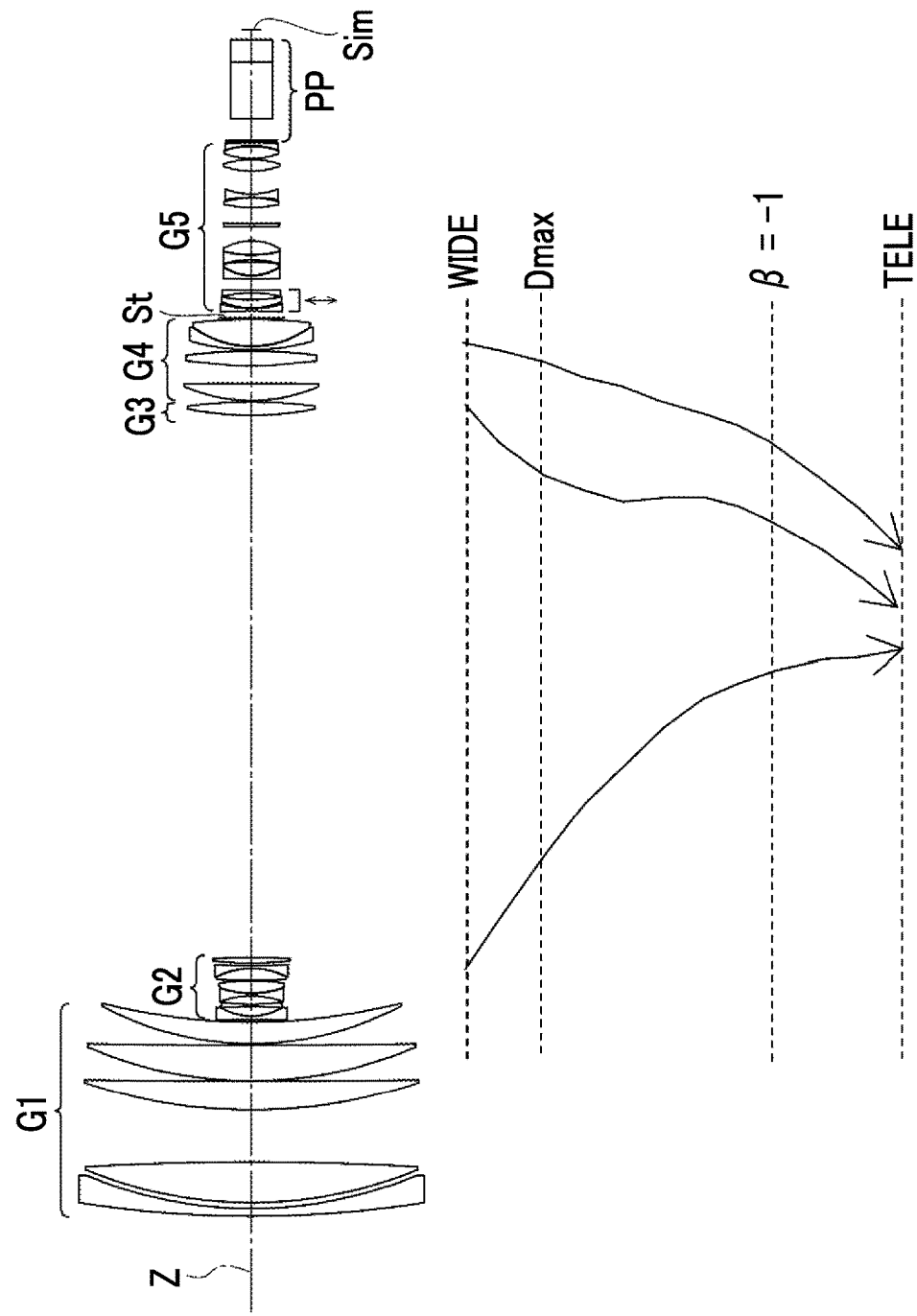
FIG. 7 is a diagram illustrating a cross-sectional view of a configuration and a movement trajectory of a zoom lens of Example 3 of the present disclosure.
Figure 8:
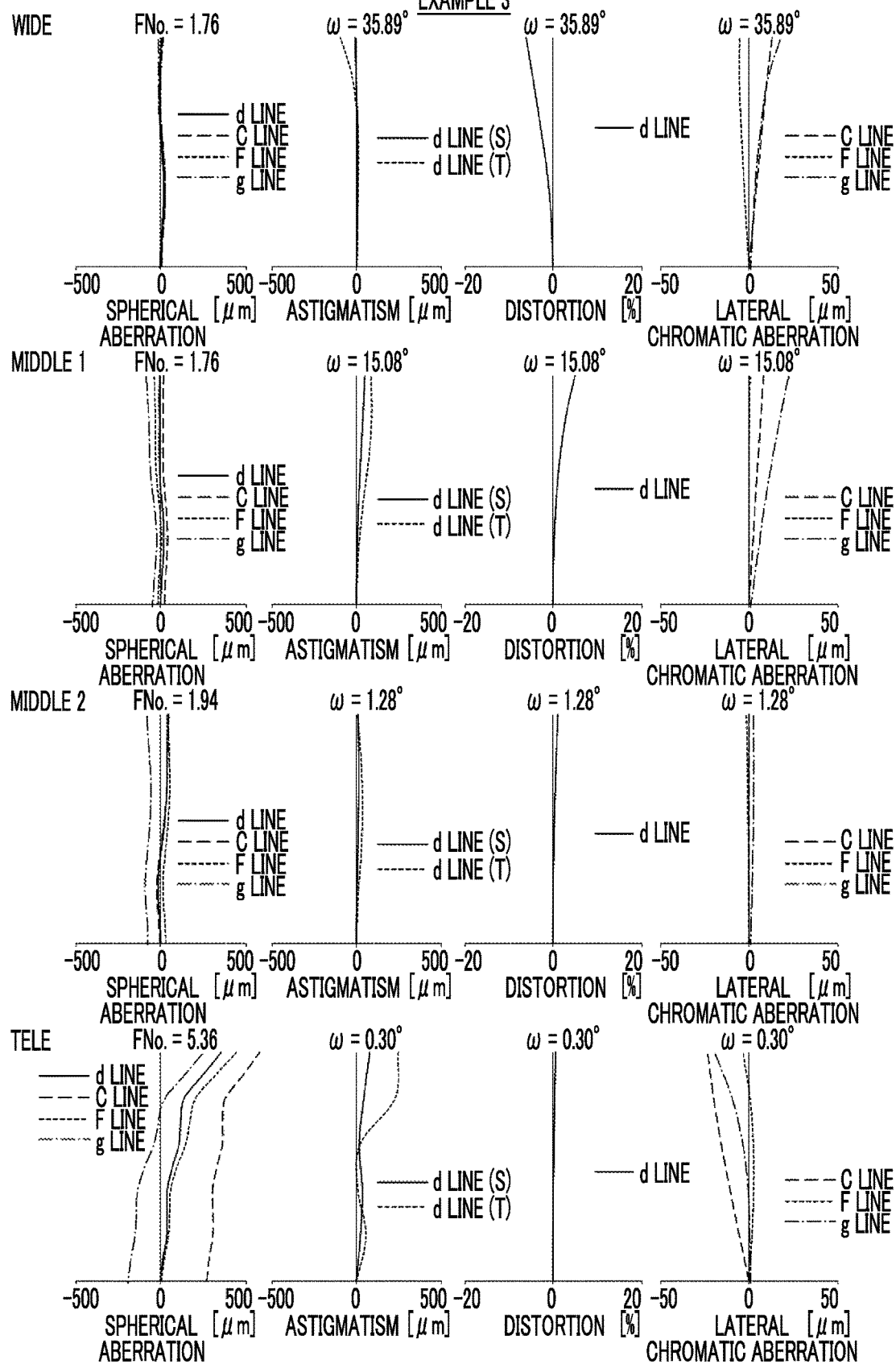
FIG. 8 is each aberration diagram of the zoom lens of Example 3 of the present disclosure.

A configuration and a movement trajectory of a zoom lens of Example 3 are illustrated in FIG. 7. The zoom lens of Example 3 has the same configuration as the summary of the zoom lens of Example 1. For the zoom lens of Example 3, fundamental lens data is shown in Table 7A and Table 7B, specifications and variable surface intervals are shown in Table 8, aspherical coefficients are shown in Table 9, and each aberration diagram is illustrated in FIG. 8.

TABLE 7A

Example 3

| Sn | R | D | Nd | vd | θgF |
|---|---|---|---|---|---|
| 1 | 680.04174 | 4.400 | 1.83400 | 37.18 | 0.5778 |
| 2 | 261.01526 | 3.375 | | | |
| 3 | 264.09210 | 23.690 | 1.43387 | 95.18 | 0.5373 |
| 4 | −1730.11818 | 30.530 | | | |
| 5 | 318.45317 | 17.014 | 1.43387 | 95.18 | 0.5373 |
| 6 | 7261.43056 | 0.120 | | | |
| 7 | 251.62243 | 20.852 | 1.43387 | 95.18 | 0.5373 |
| 8 | 6344.93784 | 0.970 | | | |
| 9 | 193.30454 | 12.506 | 1.43875 | 94.94 | 0.5343 |
| 10 | 366.37628 | DD[10] | | | |
| 11 | −802.82621 | 2.000 | 2.00069 | 25.46 | 0.6136 |
| *12 | 35.75153 | 5.446 | | | |
| 13 | −296.25853 | 1.500 | 1.99657 | 26.68 | 0.6081 |
| 14 | 130.14170 | 4.899 | | | |
| 15 | −53.43173 | 1.520 | 1.92612 | 28.22 | 0.6041 |
| 16 | 57.21856 | 7.259 | 1.93056 | 26.66 | 0.6096 |
| 17 | −134.74234 | 0.196 | | | |
| 18 | 319.85960 | 7.020 | 1.97464 | 17.64 | 0.6598 |
| 19 | −45.72489 | 1.520 | 1.82592 | 45.41 | 0.5596 |
| 20 | 405.01068 | 1.569 | | | |
| 21 | 198.31933 | 3.275 | 1.43700 | 95.10 | 0.5336 |
| 22 | −339.32355 | DD[22] | | | |
| 23 | 198.28624 | 7.748 | 1.49700 | 81.54 | 0.5375 |
| *24 | −276.91056 | DD[24] | | | |
| 25 | 101.25911 | 10.002 | 1.43700 | 95.10 | 0.5336 |

TABLE 7A-continued

Example 3

| Sn | R | D | Nd | vd | θgF |
|---|---|---|---|---|---|
| 26 | −3622.86115 | 10.245 | | | |
| *27 | 212.95950 | 8.624 | 1.43700 | 95.10 | 0.5336 |
| 28 | −319.50647 | 0.774 | | | |
| 29 | 136.78700 | 2.000 | 1.80000 | 29.84 | 0.6018 |
| 30 | 60.89243 | 15.645 | 1.43700 | 95.10 | 0.5336 |
| 31 | −298.96287 | DD[31] | | | |

TABLE 7B

Example 3

| Sn | R | D | Nd | Vd | θ gF |
|---|---|---|---|---|---|
| 32 (St) | ∞ | 4.144 | | | |
| 33 | −270.46727 | 1.500 | 1.77250 | 49.62 | 0.5519 |
| 34 | 71.61008 | 0.120 | | | |
| 35 | 45.29719 | 4.669 | 1.80518 | 25.46 | 0.6157 |
| 36 | 85.63546 | 3.979 | | | |
| 37 | −75.69478 | 1.500 | 1.48749 | 70.32 | 0.5292 |
| 38 | 2077.61369 | 6.807 | | | |
| 39 | 704.37572 | 2.000 | 1.84641 | 37.15 | 0.5793 |
| 40 | 30.20266 | 7.972 | 1.80518 | 25.43 | 0.6103 |
| 41 | −94.82292 | 1.174 | | | |
| 42 | −55.04147 | 3.000 | 1.90265 | 35.77 | 0.5816 |
| 43 | 65.65840 | 8.346 | 1.43090 | 73.18 | 0.5233 |
| 44 | −33.43907 | 8.318 | | | |
| 45 | −2428.34187 | 1.749 | 1.57522 | 68.43 | 0.5412 |
| 46 | 1033.35431 | 9.258 | | | |
| 47 | 67.36381 | 5.758 | 1.59850 | 43.96 | 0.5706 |
| 48 | −56.78399 | 0.193 | | | |
| 49 | −99.15447 | 2.000 | 1.90265 | 35.77 | 0.5816 |
| 50 | 44.12175 | 13.325 | | | |
| 51 | 51.67211 | 6.715 | 1.45871 | 64.00 | 0.5306 |
| 52 | −56.15718 | 0.575 | | | |
| 53 | 46.55463 | 7.227 | 1.48749 | 70.32 | 0.5292 |
| 54 | −51.69314 | 2.000 | 1.90265 | 35.77 | 0.5816 |
| 55 | −200.45453 | 0.250 | | | |
| 56 | ∞ | 1.000 | 1.51633 | 64.14 | 0.5353 |
| 57 | ∞ | 12.574 | | | |
| 58 | ∞ | 33.000 | 1.60859 | 46.44 | 0.5666 |
| 59 | ∞ | 13.200 | 1.51633 | 64.05 | 0.5346 |
| 60 | ∞ | 5.511 | | | |

TABLE 8

Example 3

| | WIDE | MIDDLE1 | MIDDLE2 | TELE |
|---|---|---|---|---|
| Zr | 1.00 | 2.40 | 30.09 | 130.00 |
| f | 8.098 | 19.434 | 243.681 | 1052.684 |
| Bf | 48.215 | 48.215 | 48.215 | 48.215 |
| FN0. | 1.76 | 1.76 | 1.94 | 5.36 |
| 2ω (°) | 71.78 | 30.16 | 2.56 | 0.60 |
| DD[10] | 1.457 | 69.308 | 176.892 | 191.412 |
| DD[22] | 315.870 | 204.641 | 68.292 | 0.007 |
| DD[24] | 0.859 | 32.120 | 12.120 | 1.658 |
| DD[31] | 0.870 | 12.988 | 61.753 | 125.980 |

TABLE 9

Example 3

| Sn | 12 | 24 | 27 |
|---|---|---|---|
| KA | 1.0000000E+00 | 1.0000000E+00 | 1.0000000E+00 |
| A4 | −1.8336630E−07 | 1.8631554E−07 | −1.5675660E−07 |
| A6 | −7.3558232E−09 | −5.3007998E−10 | −7.6962929E−10 |
| A8 | 1.6167670E−10 | 1.1881991E−12 | 1.8379490E−12 |
| A10 | −2.2874982E−12 | −1.5478553E−15 | −2.6446956E−15 |
| A12 | 1.8610513E−14 | 1.2000865E−18 | 2.3682802E−18 |
| A14 | −8.9189073E−17 | −5.0950052E−22 | −1.2932791E−21 |
| A16 | 2.4736564E−19 | 7.6398075E−26 | 3.9498217E−25 |
| A18 | −3.6524105E−22 | 1.8484668E−29 | −5.2301920E−29 |
| A20 | 2.2107592E−25 | −6.1837241E−33 | 2.9103220E−34 |

Table 10 shows corresponding values of Conditional Expressions (1) to (7) of the zoom lenses of Examples 1 to 3.

TABLE 10

| Expression Number | | Example 1 | Example 2 | Example 3 |
|---|---|---|---|---|
| (1) | f2/f21 | 0.74 | 0.73 | 0.73 |
| (2) | ν2p | 94.94 | 81.64 | 95.10 |
| (3) | β2t/β2w | 18.34 | 18.65 | 18.66 |
| (4) | f4/f3 | 0.49 | 0.49 | 0.49 |
| (5) | (D34max − D34w)/f34w | 0.409 | 0.407 | 0.396 |
| (6) | β34t/β34w | 6.53 | 6.69 | 6.74 |
| (7) | fw/fois | −0.10 | −0.10 | −0.10 |

As is perceived from the data described above, even in a case where the zoom lenses of Examples 1 to 3 are configured in a small size, the total angle of view at the wide angle end is greater than or equal to 70 degrees, and a wide angle of view is provided. The zoom magnification is greater than or equal to a power of 120, and a high magnification is achieved. High optical characteristics are implemented by favorably correcting various types of aberration. In the imaging apparatus, for example, in a case where the zoom lens is used in combination with an imaging element in which the diameter of an imaging surface is 11 millimeters (mm), it may be required that the diameter of the lens closest to the object side is less than or equal to 205 millimeters (mm). Examples 1 to 3 can deal with such a requirement.

Figure 9:
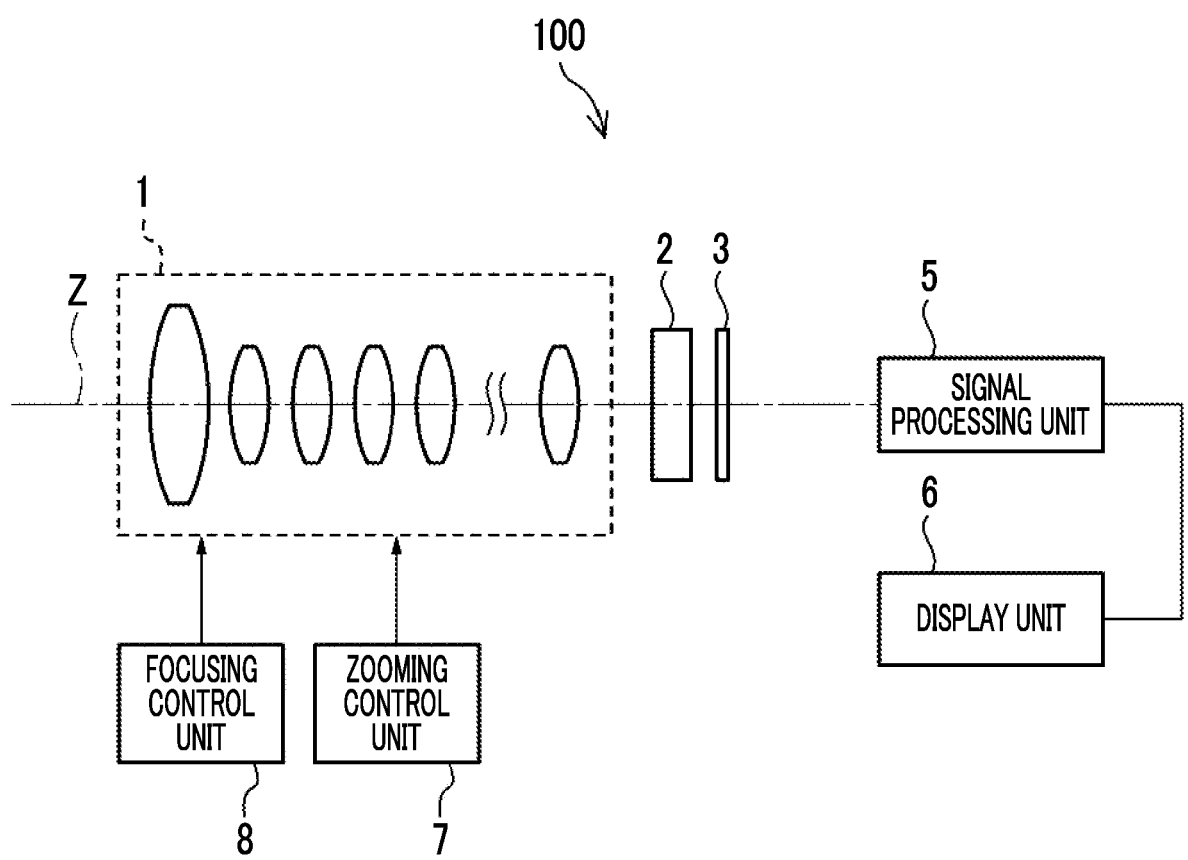
FIG. 9 is a schematic configuration diagram of an imaging apparatus according to one embodiment of the present disclosure.

Next, an imaging apparatus according to the embodiment of the present disclosure will be described. FIG. 9 illustrates a schematic configuration diagram of an imaging apparatus 100 using a zoom lens 1 according to the embodiment of the present disclosure as one example of an imaging apparatus according to the embodiment of the present disclosure. For example, a broadcasting camera, a movie imaging camera, a video camera, and a monitoring camera can be exemplified as the imaging apparatus 100.

The imaging apparatus 100 comprises the zoom lens 1, a filter 2 arranged on the image side of the zoom lens 1, and an imaging element 3 arranged on the image side of the filter 2. In FIG. 9, a plurality of lenses comprised in the zoom lens 1 are schematically illustrated.

The imaging element 3 converts an optical image formed by the zoom lens 1 into an electric signal and can use, for example, a charge coupled device (CCD) or a complementary metal oxide semiconductor (CMOS). The imaging element 3 is arranged such that an imaging surface thereof matches an image surface of the zoom lens 1.

The imaging apparatus 100 also comprises a signal processing unit 5 performing calculation processing on an output signal from the imaging element 3, a display unit 6 displaying an image formed by the signal processing unit 5, a zooming control unit 7 controlling zooming of the zoom lens 1, and a focusing control unit 8 controlling focusing of the zoom lens 1. While only one imaging element 3 is illustrated in FIG. 9, a so-called three-plate type imaging apparatus including three imaging elements may also be used.

While the technology of the present disclosure has been illustratively described with the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values shown in each example of the numerical values and may have other values.

What is claimed is:

1. A zoom lens comprising, in order from an object side to an image side:
    only five lens groups consisting of a first lens group having a positive refractive power, a second lens group having a negative refractive power, a third lens group having a positive refractive power, a fourth lens group having a positive refractive power, and a fifth lens group having a positive refractive power as lens groups,
    wherein during zooming, the first lens group and the fifth lens group are fixed with respect to an image surface, and the second lens group, the third lens group, and the fourth lens group are moved along an optical axis by changing intervals with an adjacent lens group,
    the second lens group includes a negative lens closest to the object side,
    in a case where a focal length of the second lens group is denoted by f2, and a focal length of the negative lens of the second lens group closest to the object side is denoted by f21, Conditional Expression (1) is satisfied, which is represented by $$0.6 < f2/f21 < 0.9 \quad (1),$$

the second lens group includes at least one positive lens, and
    in a case where a maximum value of a d line-based Abbe number of all positive lenses included in the second lens group is denoted by ν2p, Conditional Expression (2) is satisfied, which is represented by $$70 < \nu 2p < 110 \quad (2).$$

2. The zoom lens according to claim 1,
    wherein in a case where a lateral magnification of the second lens group at a telephoto end is denoted by β2t, and a lateral magnification of the second lens group at a wide angle end is denoted by β2w, Conditional Expression (3) is satisfied, which is represented by $$10 < \beta 2t/\beta 2w < 25 \quad (3).$$

3. The zoom lens according to claim 2,
    wherein Conditional Expression (3-1) is satisfied, which is represented by $$15 < \beta 2t/\beta 2w < 20 \quad (3\text{-}1).$$

4. The zoom lens according to claim 1,
    wherein a surface, on the image side, of the negative lens of the second lens group closest to the object side has an aspherical shape that has a refractive power lower than a refractive power in a paraxial region at an intersection between a principal ray of a maximum angle of view at a wide angle end and the surface.

5. The zoom lens according to claim 1,
    wherein in a case where a focal length of the third lens group is denoted by f3, and a focal length of the fourth lens group is denoted by f4, Conditional Expression (4) is satisfied, which is represented by $$0.4 < f4/f3 < 1 \quad (4).$$

6. The zoom lens according to claim 5,
    wherein Conditional Expression (4-1) is satisfied, which is represented by $$0.45 < f4/f3 < 0.65 \quad (4\text{-}1).$$

7. The zoom lens according to claim 1,
    wherein during zooming from a wide angle end to a telephoto end, a third and fourth combined lens group obtained by combining the third lens group and the fourth lens group, and the second lens group pass through a point at which a lateral magnification is a power of −1 at the same time, and the fourth lens group is moved to the object side.

8. The zoom lens according to claim 7,
    wherein an interval between the third lens group and the fourth lens group is largest on a wide angle side from a zoom position at which the lateral magnification of the third and fourth combined lens group is a power of −1.

9. The zoom lens according to claim 8,
    wherein in a case where a maximum value of the interval on the optical axis between the third lens group and the fourth lens group is denoted by D34 max, the interval on the optical axis between the third lens group and the fourth lens group at a wide angle end is denoted by D34w, and a combined focal length of the third lens group and the fourth lens group at the wide angle end is denoted by f34w, Conditional Expression (5) is satisfied, which is represented by $$0.35 < (D34\,\text{max} - D34w)/f34w < 0.45 \quad (5).$$

10. The zoom lens according to claim 9,
    wherein Conditional Expression (5-1) is satisfied, which is represented by $$0.38 < (D34\,\text{max} - D34w)/f34w < 0.41 \quad (5\text{-}1).$$

11. The zoom lens according to claim 1,
    wherein in a case where a combined lateral magnification of the third lens group and the fourth lens group at a telephoto end is denoted by β34t, and a combined lateral magnification of the third lens group and the fourth lens group at a wide angle end is denoted by β34w, Conditional Expression (6) is satisfied, which is represented by $$4 < \beta 34t/\beta 34w < 8 \quad (6).$$

12. The zoom lens according to claim 11,
    wherein Conditional Expression (6-1) is satisfied, which is represented by $$5 < \beta 34t/\beta 34w < 7.5 \quad (6\text{-}1).$$

13. The zoom lens according to claim 1,
    wherein a stop is arranged between the fourth lens group and the fifth lens group, and
    the fifth lens group includes, closest to the object side, a vibration proof lens group that is moved in a direction intersecting with the optical axis during image shake correction.

14. The zoom lens according to claim 13,
wherein the vibration proof lens group consists of a negative lens, a positive lens, and a negative lens in order from the object side to the image side.

15. The zoom lens according to claim 13,
wherein the vibration proof lens group has a negative refractive power, and
in a case where a focal length of the zoom lens at a wide angle end is denoted by fw, and a focal length of the vibration proof lens group is denoted by fois, Conditional Expression (7) is satisfied, which is represented by $$-0.2 < fw/fois < 0 \qquad (7).$$

16. The zoom lens according to claim 15,
wherein Conditional Expression (7-1) is satisfied, which is represented by $$-0.15 < fw/fois < -0.05 \qquad (7\text{-}1).$$

17. The zoom lens according to claim 1,
wherein Conditional Expression (1-1) is satisfied, which is represented by $$0.68 < f2/f21 < 0.8 \qquad (1\text{-}1).$$

18. The zoom lens according to claim 1,
wherein Conditional Expression (2-1) is satisfied, which is represented by $$80 < v2p < 100 \qquad (2\text{-}1).$$

19. An imaging apparatus comprising:
the zoom lens according to claim 1.

* * * * *